United States Patent
Francies, III

(10) Patent No.: US 9,638,353 B2
(45) Date of Patent: May 2, 2017

(54) CLIP FOR SUPPORTING A PRESTRESSED CABLE ALONG A DOVETAIL SLOT IN A CEMENT CASTING

(71) Applicant: Sidney E. Francies, III, Lithia, FL (US)

(72) Inventor: Sidney E. Francies, III, Lithia, FL (US)

(73) Assignee: A.L. Patterson, Inc., Fairless Hills, PA (US)

( * ) Notice: Subject to any disclaimer, the term of this patent is extended or adjusted under 35 U.S.C. 154(b) by 35 days.

(21) Appl. No.: 14/931,407

(22) Filed: Nov. 3, 2015

(65) Prior Publication Data

US 2016/0123501 A1 May 5, 2016

Related U.S. Application Data

(60) Provisional application No. 62/074,300, filed on Nov. 3, 2014.

(51) Int. Cl.
| | | |
|---|---|---|
| *E04C 5/16* | (2006.01) | |
| *F16L 3/02* | (2006.01) | |
| *E04C 5/08* | (2006.01) | |
| *E04C 5/20* | (2006.01) | |

(52) U.S. Cl.
CPC ...... *F16L 3/02* (2013.01); *E04C 5/08* (2013.01); *E04C 5/16* (2013.01); *E04C 5/168* (2013.01); *E04C 5/20* (2013.01)

(58) Field of Classification Search
CPC .... F16L 3/02; E04C 5/08; E04C 5/168; E04C 5/16; E04C 5/20
USPC ........................................ 403/384, 386, 396
See application file for complete search history.

(56) References Cited

U.S. PATENT DOCUMENTS

| | | | | |
|---|---|---|---|---|
| 1,674,476 | A * | 6/1928 | Mathews | E04C 5/168 52/686 |
| 1,943,677 | A * | 1/1934 | Kearney | H01R 4/32 403/396 |
| 2,509,513 | A * | 5/1950 | Mast | C08K 5/33 524/430 |
| 3,006,114 | A * | 10/1961 | Hillberg | E04C 5/08 249/205 |
| 3,230,678 | A * | 1/1966 | Eriksson | E04C 5/08 52/223.13 |
| 5,230,295 | A * | 7/1993 | Shell | B60P 7/0823 114/218 |
| 2004/0232287 | A1* | 11/2004 | Rosemann | F16L 3/02 248/68.1 |
| 2006/0091279 | A1* | 5/2006 | Jones | F16L 3/02 248/431 |
| 2007/0044423 | A1* | 3/2007 | Funk | E04C 5/20 52/714 |

(Continued)

FOREIGN PATENT DOCUMENTS

WO    WO 2007/056862    * 5/2007    ............... F16L 3/02

*Primary Examiner* — Michael Safavi
(74) *Attorney, Agent, or Firm* — McGarry Bair PC

(57) ABSTRACT

A clip for securing a prestressed cable along a dovetail slot within a cement cast for masonry work. The clip contains a cup receiving the prestressed cable and legs for a fixed attachment to the outside of a dovetail bar. A method of installing the clip includes inserting the clip between the dovetail slot and the prestressed cable and rotating the clip such that the prestressed cable is received within the cup and the legs capture the dovetail slot.

20 Claims, 5 Drawing Sheets

(56) References Cited

U.S. PATENT DOCUMENTS

| | | | | |
|---|---|---|---|---|
| 2008/0115449 A1* | 5/2008 | Kodi | ........................ | E04C 5/167 52/719 |
| 2010/0043337 A1* | 2/2010 | Banks | ...................... | E04C 5/167 52/649.8 |
| 2010/0300033 A1* | 12/2010 | Trangsrud | ............... | E04C 5/168 52/685 |
| 2010/0307098 A1* | 12/2010 | Yee | ........................ | E04C 5/168 52/677 |
| 2011/0067344 A1* | 3/2011 | Swenson | ................. | E04C 5/168 52/677 |
| 2014/0190116 A1* | 7/2014 | Holthusen | ............... | E04C 5/167 52/684 |
| 2014/0331592 A1* | 11/2014 | Lawrence | ................ | E04C 5/168 52/677 |
| 2014/0373310 A1* | 12/2014 | Leo, II | ...................... | F16B 2/22 24/129 R |
| 2015/0285407 A1* | 10/2015 | Aragon | ................... | H02G 3/32 248/70 |
| 2016/0123012 A1* | 5/2016 | Francies, III | ........... | E04C 5/168 248/68.1 |
| 2016/0153192 A1* | 6/2016 | Smith | ..................... | E04C 5/167 52/649.8 |

* cited by examiner

CLIP FOR SUPPORTING A PRESTRESSED CABLE ALONG A DOVETAIL SLOT IN A CEMENT CASTING

CROSS-REFERENCE TO RELATED APPLICATIONS

The present application claims the benefit of U.S. Provisional Patent Application No. 62/074,300, filed Nov. 3, 2014.

BACKGROUND OF THE INVENTION

Field of the Invention

This invention relates to clips for securing prestressed cables along a dovetail slot in a cement cast or masonry.

Description of the Related Art

Dovetail slots are generally cast within and along concrete panels used in masonry. The dovetail slots cast within the concrete panels are generally used to attach clips or inserts for supporting masonry such as brick to be attached to the concrete panels. Dovetail slots are usually comprised of galvanized metal, stainless steel, iron, or any other strong fabricated high-strength metal or composite.

Prior to cementing operations, tensioned cables such as prestressed cables are cemented within the casts to increase strength and support. The prestressed cables cemented within the casts tend to sag or shift due to gravity or forces from a cement mixture while being poured into the cast. Additionally, during cementing operations, the dovetail slot tends to slide or move from forces applied while pouring the liquid cement. Preferably, the cables are cemented with little or no deviation from their intended position to promote accurate cutting and strength of the cement casts.

SUMMARY OF THE INVENTION

In one aspect, a strand clip for supporting a prestressed cable above a dovetail slot in a cement casting comprising a bar having a first end and a second end, a first plate fixed horizontally to the bar at the first end, a second plate fixed vertically to the body at the second end and having a plate extension in the same plane as the second plate extending to the first plate, a cup in the plate extension sized to receive a prestressed cable, and at least two legs, with one leg extending from the bar adjacent the second plate and another extending from the first plate, wherein the bar is sized to be received between the prestressed cable and the dovetail slot with the second plate disposed horizontally. When the second plate is rotated vertically, the prestressed cable is received in the cup.

In another aspect, a cement casting prepared to receive cement comprising at least one dovetail slot, a prestressed cable above the dovetail slot, and a plurality of strand clips for positioning the prestressed cable above the dovetail slot. The strand clips each comprise a bar having a first end and a second end, a first plate fixed horizontally to the body at the first end, a second plate fixed vertically to the body at the second end and having a plate extension in the same plane as the second plate extending to the first plate. The strand clips further comprise a cup in the plate extension sized to receive a prestressed cable and at least two legs, one extending from the bar adjacent the second plate and another extending from the first plate wherein the bar is sized to be received between the prestressed cable and the dovetail slot.

In another aspect, a method of supporting a prestressed cable above a dovetail slot in a cement casting comprising providing a strand clip. The strand clip comprises a bar having a first end and a second end, a first plate fixed horizontally to the body at the first end, a second plate fixed vertically to the body at the second end and having a plate extension in the same plate as the second plate extending to the first plate, a cup in the plate extension sized to receive a prestressed cable, and at least two legs, one extending from the bar adjacent the second plate an another extending from the first plate wherein the bar is sized to be received between the prestressed cable and the dovetail slot. The method further comprises positioning the strand chair so the vertical plate is horizontal, sliding the vertical plate between the prestressed cable and the dovetail slot until the dovetail slot is between the at least two legs, and rotating the vertical plate until the prestressed cable is received in the cup and the legs capture the dovetail slot.

DESCRIPTION OF THE PREFERRED EMBODIMENT

As used herein, the term 'prestressing' or 'prestressed' when used in combination with cable refers to cable, which can be or has been tensioned by a force such that the cable can become taut. It should be appreciated that the terms 'prestressing' and 'prestressed' can be used interchangeably and should not be understood as limiting the invention to either of a cable which has been tensioned or can be or will be tensioned. It is further contemplated that the invention can be utilized with a non-tensioned cable, which can be capable of tensioning.

Additionally, as used herein, the term 'horizontal' refers to a surface, plane, or axis extending parallel to the concrete cast surface along which a dovetail slot can rest. Similarly, as used herein, the term 'vertical' refers to a surface, plane, or axis extending orthogonal to the horizontal plane as previously defined.

Figure 1:
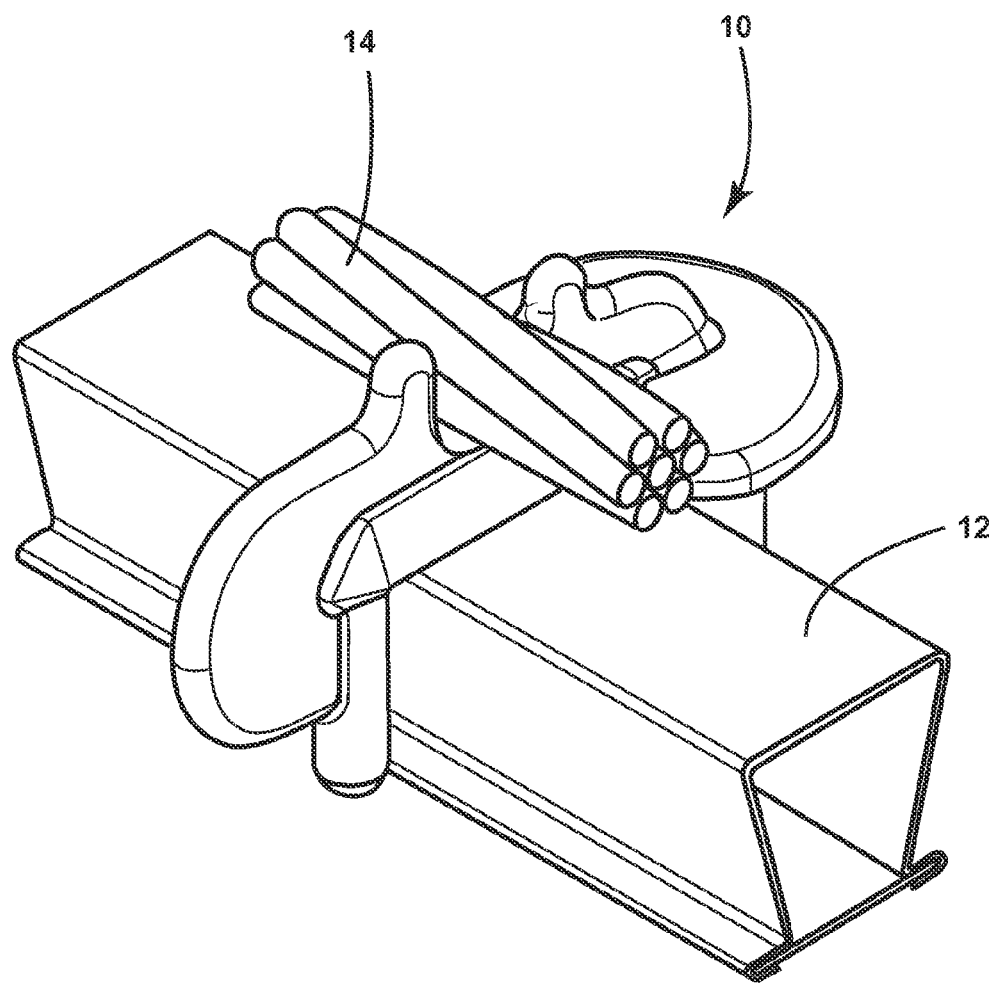
FIG. 1 is a perspective view of a prestressed cable mounted to a dovetail slot with a dovetail clip.
Figure 2:
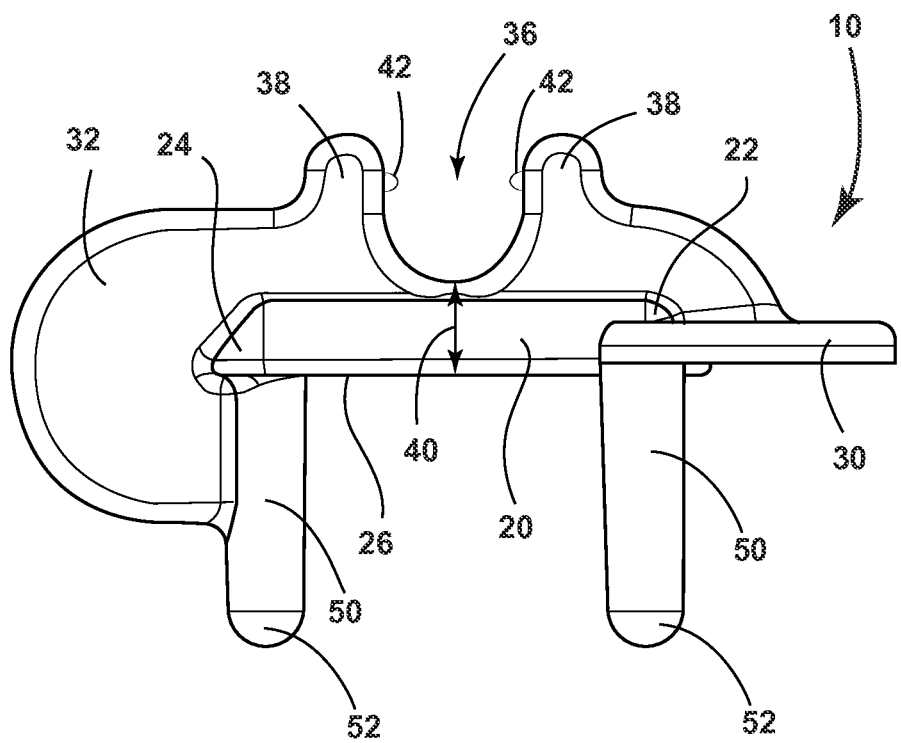
FIG. 2 is a bottom view of the dovetail clip of FIG. 1.
Figure 3:
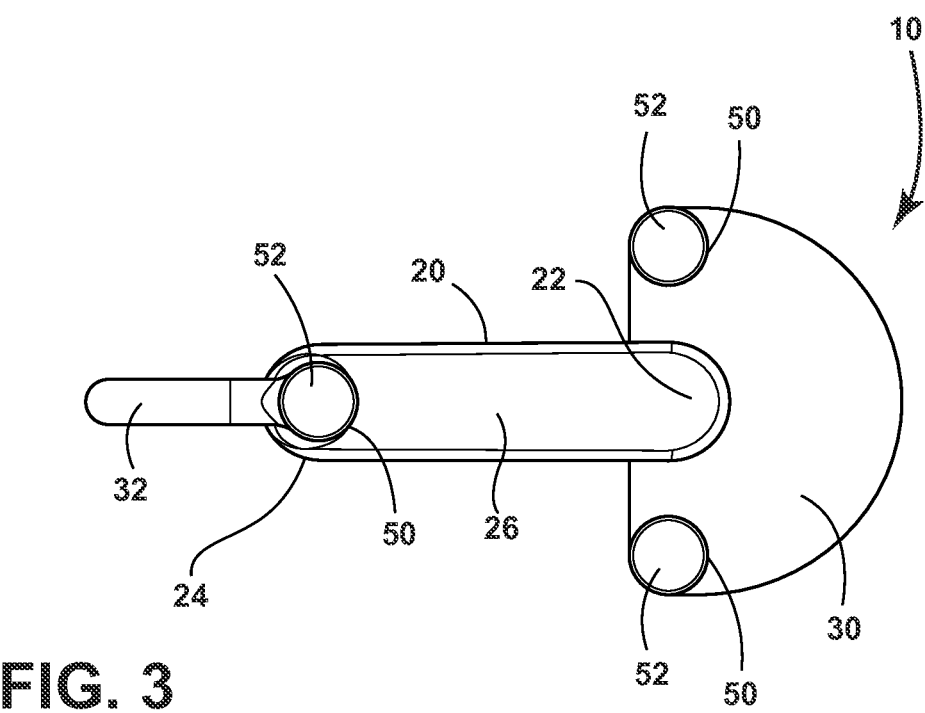
FIG. 3 is a side view of the dovetail clip of FIG. 1.
Figure 4:
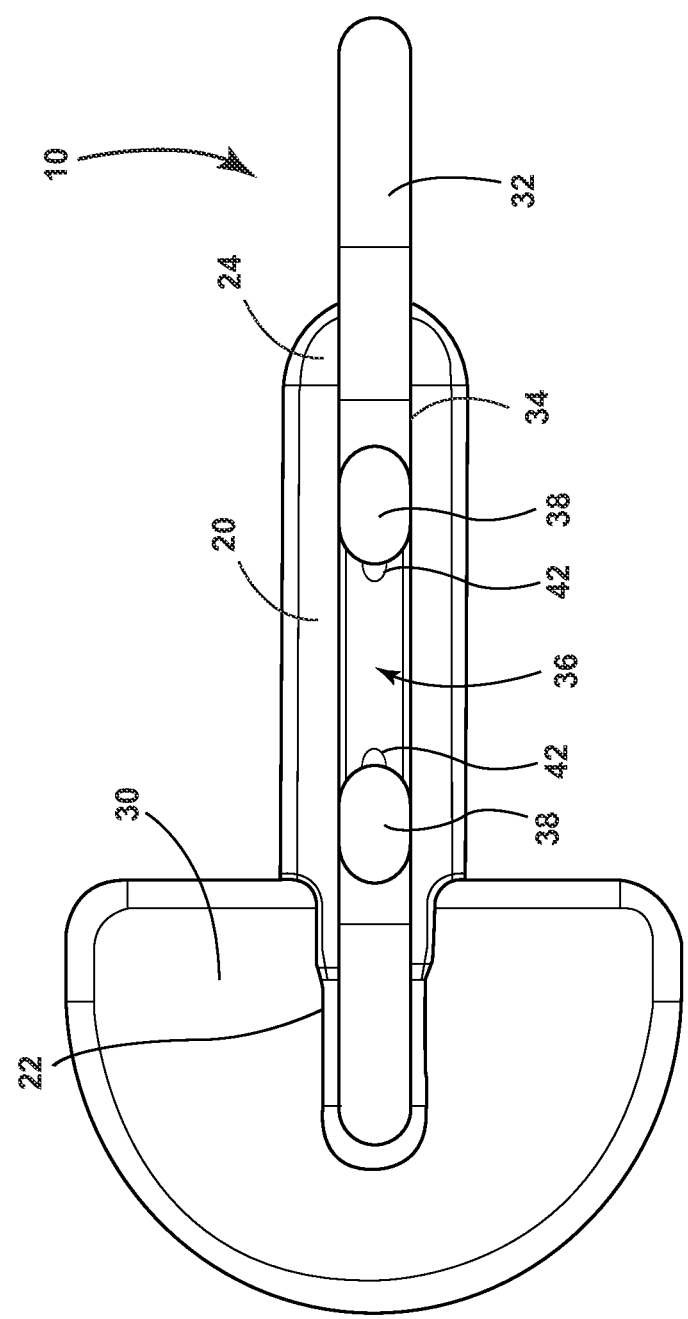
FIG. 4 is a top view of the dovetail clip of FIG. 1.
Figure 5:
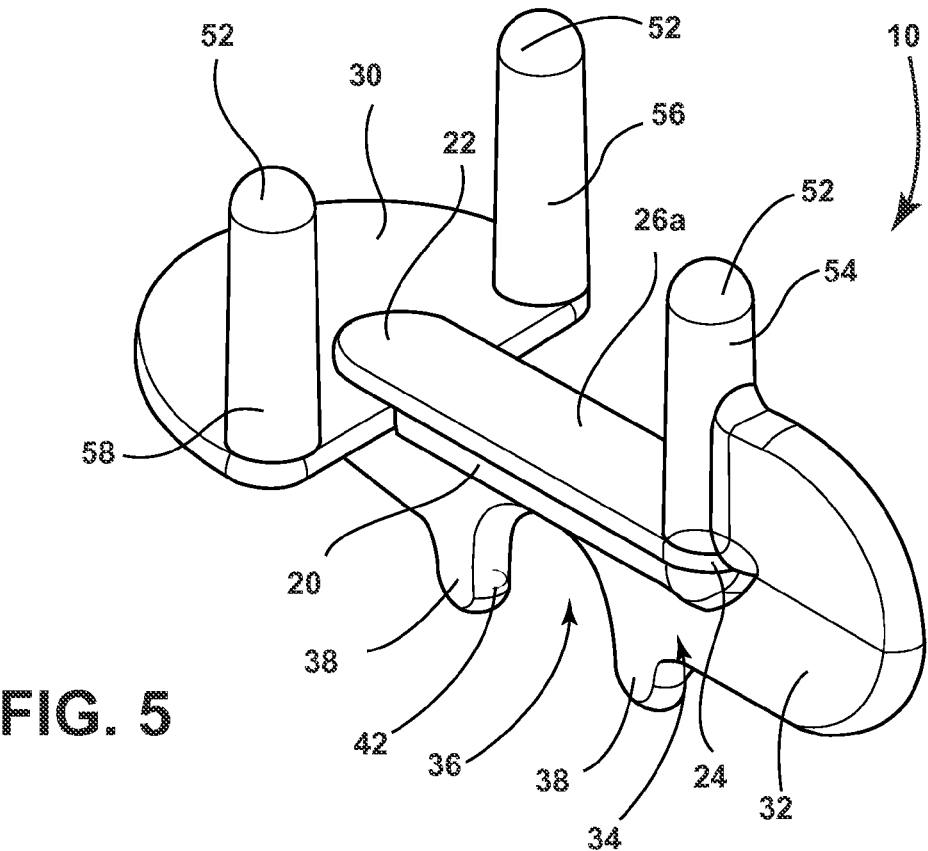
FIG. 5 is a bottom perspective view of the dovetail clip of FIG. 1.
Figure 6:
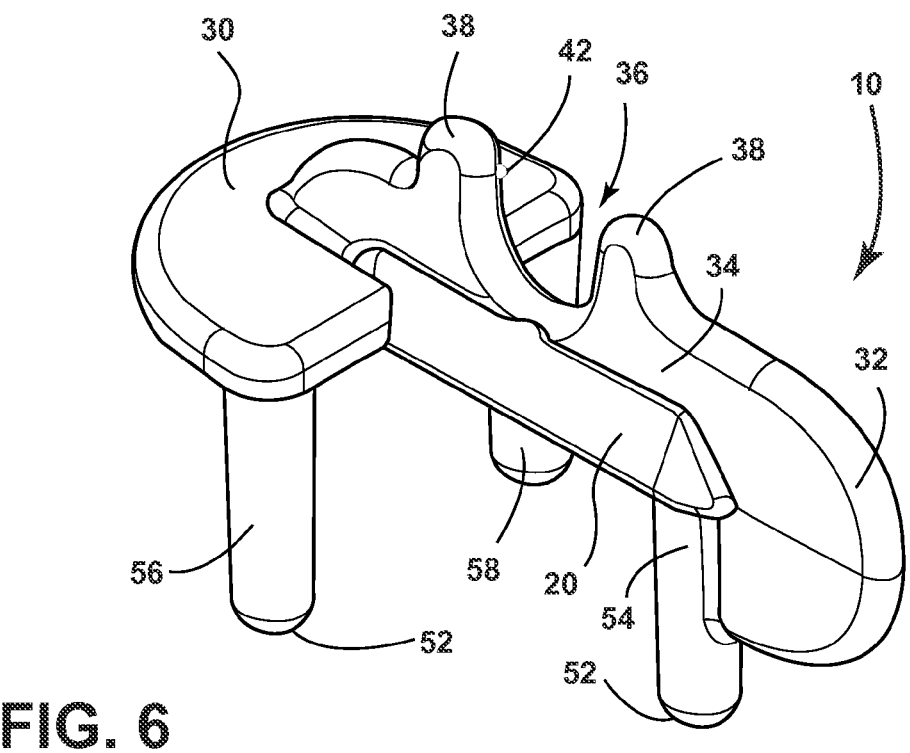
FIG. 6 is a top perspective view of the dovetail clip of FIG. 1.

Turning now to the drawings and to FIG. 1 in particular, a dovetail clip 10 is shown in its installed, final position, attached to a dovetail slot 12 and supporting a prestressed cable 14. The dovetail clip 10, dovetail slot 12, and prestressed cable 14 are ultimately cemented within a concrete casting usually used for masonry. The dovetail slot 12 is typically used for retaining supporting parts and for supporting additional masonry attachments which are mounted along the concrete cast. The prestressed cable 14 is positioned above and parallel to the dovetail slot 12. The dovetail clip 10 supports the prestressed cable 14 at a consistent distance from the dovetail slot 12 and maintains alignment of the prestressed cable 14 along the dovetail slot 12, and vice versa. The dovetail clip 10 facilitates accurate placement of the prestressed cable 14 and prevents unwanted movement of the prestressed cable 14 or dovetail slot 12 relative to one another during cementing operations. The tension of the prestressed cable 14 provides a downward force to the dovetail clip 10. The downward force, utilizing the dovetail clip 10, holds the dovetail slot 12 in position, aligned with the prestressed cable 14, facilitating accurate and optimal position of the dovetail slot 12 in the concrete casting.

In the concrete casting, multiple dovetail clips 10 can mount along the length of the dovetail slot 12 to ensure that the prestressed cable 14 secures the dovetail slot 12 in place along the length of the concrete casting. The use of dovetail clips 10 will additionally mitigate any unwanted sagging or moving of a prestressed cable 14 as uncured cement is poured into a casting. The dovetail clip 10 is preferably made of high strength plastic, carbon fibers, or polyethylene, while stronger, heavier materials such as steel, iron, stainless steel, or any other materials are contemplated. The dovetail clip 10 can be machined, cast as a single unit, or injection molded during manufacture.

Referring now to FIGS. 2-6, the dovetail clip 10 comprises a body disposed as a bar 20 having a first end 22 and a second end 24. The bar 20 further comprises a bottom surface 26 (see FIGS. 3 and 5) defining a horizontal plane. A first plate 30 is fixed to the bar 20 at the first end 22 and a second plate 32 is fixed to the bar at the second end 24. The first plate 30 is fixed horizontally, being parallel to the horizontal plane defined by the bottom surface 26. The second plate 32 is fixed vertically, relative to the horizontal plane of the bottom surface 26, being oriented normal to the first plate 30. The second plate 32 can define a vertical plane disposed parallel to the vertical disposition of the vertical plate 32. The first and second plates 30, 32, as illustrated, comprise a semi-circular shape extending from the bar 20, however, additional shapes for the plates 30, 32 are contemplated.

The second plate 32 has an extension 34 being in the vertical plane and extending from the second plate 32 over the bar 20. The extension 34 extends over the bar 20 opposite the bottom surface 26 of the bar 20, terminating in the horizontal surface of the first plate 30. The extension 34 comprises a cup 36 being sized to receive a prestressed cable 14. The cup 36 can be disposed between a set of ears 38 extending from the extension 34 opposite of the bar 20. Best seen in FIG. 2, the cup 36 is disposed within the extension 34 such that a height 40 is defined between the innermost portion of the cup 36 and the bottom surface 26. The bar 20 and the cup 36 can be sized such that the height 40 is adapted to space an inserted prestressed cable 14 from the dovetail slot 12 at a desired distance.

A portion 42 can extend from each ear 38 within the cup 36. The portions 42 are sized to permit the insertion of a prestressed cable 14 into the cup 36 while providing a retaining force to secure the dovetail clip 10 to the prestressed cable 14, preventing the prestressed cable 14 from lifting out of the cup 36 during installation, tensioning, or cementing operations.

On the opposite side of the dovetail clip 10 of the extension 34, the dovetail clip 10 can have at least two legs 50, exemplarily illustrated as three legs 50 with each leg 50 having a foot 52. Best seen in FIGS. 5 and 6, a first leg 54 extends from the second end 24 of the bar 20 adjacent to the second plate 32. Second and third legs 56, 58, extend from the first plate 30, being disposed on corners of the first plate 30 defined by the semi-circular shape of the first plate 30. In an alternative embodiment, the dovetail clip 10 can have only a second leg without the third leg, with the second leg being disposed adjacent the first end 22 of the bar 20. The legs 50 are spaced such that they capture the dovetail slot 12 when having the dovetail slot 12 inserted between the legs 50. The legs 50 capture the dovetail slot 12 utilizing a frictional force, and further prevent lateral movement of the dovetail clip 10, prestressed cable 14, or the dovetail slot 12 relative to one another.

Figure 7:
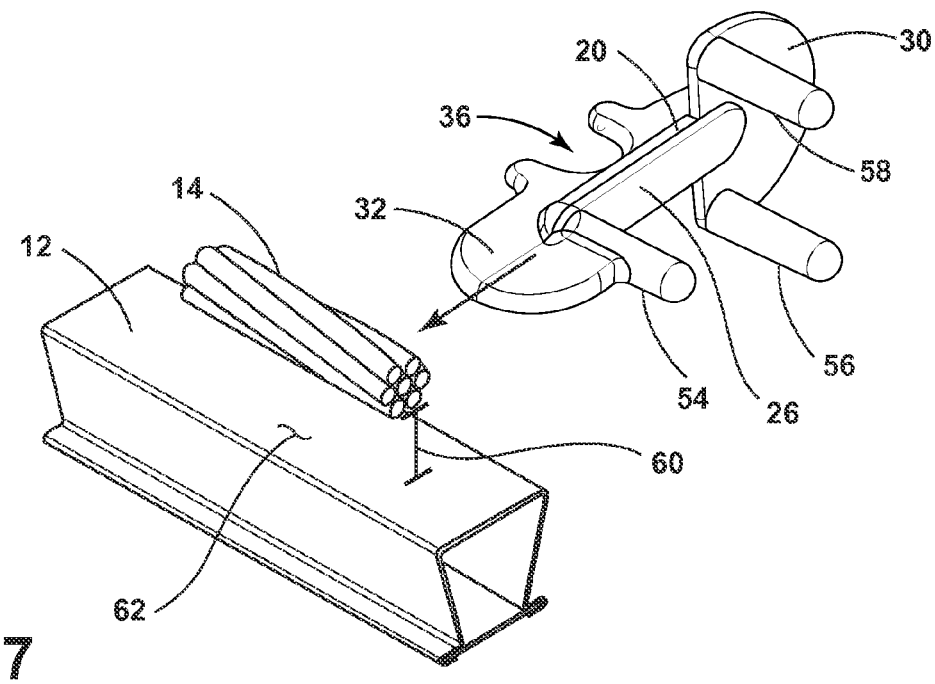
FIG. 7 is a view illustrating inserting the dovetail clip according to a method of installing the dovetail clip.

Turning now to FIG. 7, the method of inserting the dovetail clip 10 between the prestressed cable 14 and the dovetail slot 12 can be described. The dovetail clip 10 is positioned such that the first plate 30 is disposed vertically and that the second plate 32 is disposed horizontally, relative to a horizontal plane defined by the top surface 62 of the dovetail slot 12 on which the dovetail clip 10 can rest. As can be appreciated, the disposition of the dovetail clip 10 can be accomplished by rotation of the dovetail clip 10 about an axis extending longitudinally through the bar 20. The width of the first leg 54, the bar 20, the second plate 32, and the extension 34 can be of a thickness such that a gap 60 between the dovetail slot 12 and the prestressed cable 14 is wider than the thickness, facilitating sliding insertion of the dovetail clip 10 into the gap 60. The dovetail clip 10 is inserted until the end of the first plate 30 and the second leg 56 abut the dovetail slot 12.

Figure 8:
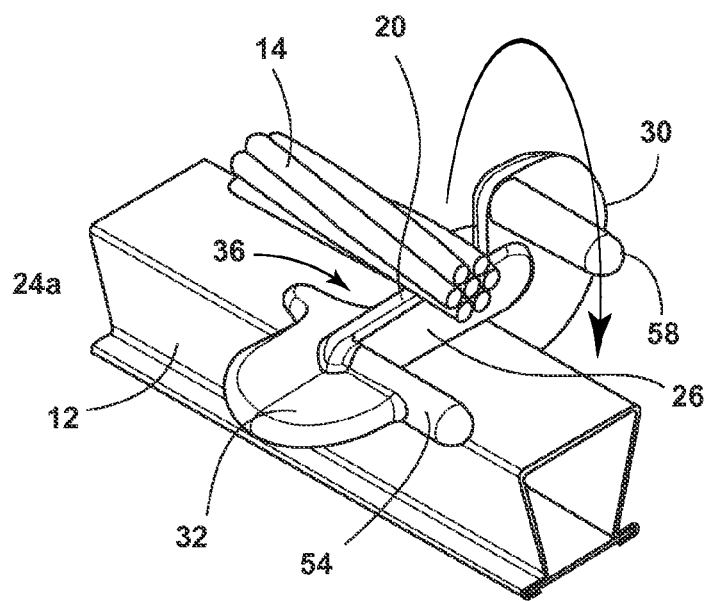
FIG. 8 is a view illustrating rotating the dovetail clip after insertion.

In FIG. 8, after the sliding insertion as shown in FIG. 7, the dovetail clip 10 can be rotated about the longitudinal axis defined by the bar 20. During rotation, the horizontal orientation of the second plate becomes vertical, and the vertical orientation of the first plate becomes horizontal. Thus, from the position upon insertion, the dovetail clip 10 is rotated 90-degrees such that the prestressed cable 14 is received in the cup 36, and the flat bottom surface 26 rests flat upon the top surface 62 of the dovetail slot 12. After properly rotating the dovetail clip 10 as shown in FIG. 8, the final installed position is reflected in FIG. 1. This process can be repeated for multiple dovetail clips 10 being installed within a concrete casting, being installed along the same dovetail slot 12 or multiple separate dovetail slots 12.

In the final installed position, the legs 50 capture the dovetail slot 12, preventing lateral movement of the prestressed cable 14 relative to the dovetail slot 12. Furthermore, the portions 42 extending into the cup 36 grip the inserted prestressed cable 14. The portions 42 hold the dovetail clip 10 to the prestressed cable 14 if the prestressed cable 14 moves away from the dovetail slot 12, with the legs 50 having a sufficient length to capture the dovetail slot 12 when the prestressed cable 14 returns to its initial position.

The method as described is preferably accomplished by human force by inserting and twisting each dovetail clip 10 by hand. This is accomplished by gripping the first plate 30, inserting the dovetail clip 10 between the prestressed cable 14 and the dovetail slot 12, and rotating the dovetail clip 10 in a until the prestressed cable 14 is received in the cup 36. This method provides for easy installation, saving time and money while effectively securing the dovetail slot 12 in a cement cast, utilizing the force from stressing the prestressed cables 14.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A strand clip for supporting a prestressed cable above a dovetail slot in a cement casting comprising:
   a bar having a first end and a second end;
   a first plate fixed horizontally to the bar at the first end;
   a second plate fixed vertically to the body at the second end and having a plate extension in the same plane as the second plate extending to the first plate;
   a cup in the plate extension sized to receive a prestressed cable; and
   at least two legs, one extending from the bar adjacent the second plate and another extending from the first plate, wherein the bar is sized to be received between the prestressed cable and the dovetail slot with the second plate disposed horizontally, and when the second plate is rotated vertically, the prestressed cable is received in the cup.

2. The strand clip of claim 1 further comprising two legs extending from the first plate.

3. The strand clip of claim 2 wherein the legs further comprise feet.

4. The strand clip of claim 1 further comprising ears adjacent the cup.

5. The strand clip of claim 4 wherein the ears have a portion extending into the space of the cup to retain the prestressed cable in the cup.

6. The strand clip of claim 1 wherein the strand clip comprises high strength plastic or polymers.

7. The strand clip of claim 6 wherein the strand clip is injection molded.

8. The strand clip of claim 1 wherein the legs are long enough to capture the dovetail slot.

9. A cement casting prepared to receive cement comprising:
   at least one dovetail slot;
   a prestressed cable above the dovetail slot; and
   a plurality of strand clips for positioning the prestressed cable above the dovetail slot, wherein the strand clips each comprise a bar having a first end and a second end, a first plate fixed horizontally to the body at the first end, a second plate fixed vertically to the body at the second end and having a plate extension in the same plane as the second plate extending to the first plate, a cup in the plate extension sized to receive a prestressed cable, and at least two legs, one extending from the bar adjacent the second plate and another extending from the first plate wherein the bar is sized to be received between the prestressed cable and the dovetail slot.

10. The cement casing of claim 9 wherein the plurality of strand clips each comprise two legs extending from the first plate.

11. The cement casing of claim 9 wherein the plurality of strand clips each comprise ears adjacent the cup.

12. The cement casing of claim 11 wherein the ears have a portion extending into the space of the cup to retain the prestressed cable in the cup.

13. The cement casing of claim 9 wherein the plurality of strand clips comprise high strength plastic or polymers.

14. The cement casing of claim 13 wherein the plurality of strand clips are injection molded.

15. The cement casing of claim 14 wherein the legs are long enough to capture the dovetail slot.

16. The cement casing of claim 15 wherein the legs further comprise feet.

17. A method of supporting a prestressed cable above a dovetail slot in a cement casting, the method comprising:
   providing a strand clip comprising a bar having a first end and a second end, a first plate fixed horizontally to the body at the first end, a second plate fixed vertically to the body at the second end and having a plate extension in the same plane as the second plate extending to the first plate, a cup in the plate extension sized to receive a prestressed cable, and at least two legs, one extending from the bar adjacent the second plate and another extending from the first plate wherein the bar is sized to be received between the prestressed cable and the dovetail slot;
   positioning the strand clip so the vertical plate is horizontal;
   sliding the vertical plate between the prestressed cable and the dovetail slot until the dovetail slot is between the at least two legs; and
   rotating the vertical plate until the prestressed cable is received in the cup and the legs capture the dovetail slot.

18. A method of supporting a prestressed cable with multiple strand clips above a dovetail slot in a cement casting comprising performing the method of claim 17 for each strand clip.

19. The method of claim 17 further comprising pouring an amount of cement into the cement casting.

20. The method of claim 17 further comprising tensioning a cable above the dovetail slot before positioning the strand clip so the vertical plate is horizontal.

* * * * *